(12) United States Patent
Dove et al.

(10) Patent No.: US 8,721,918 B2
(45) Date of Patent: May 13, 2014

(54) METHOD FOR PURIFYING FLUORIDE ETCHING SOLUTION BY USING HYDROXIDE COMPOUND AND ION EXCHANGE RESIN ABSORPTION

(75) Inventors: Curtis Douglas Dove, Kaohsiung (TW); Kehchyn Ho, Kaohsiung (TW)

(73) Assignee: Asia Union Electronical Chemical Corp., Datong Dist., Taipei (TW)

( * ) Notice: Subject to any disclaimer, the term of this patent is extended or adjusted under 35 U.S.C. 154(b) by 121 days.

(21) Appl. No.: 13/102,549

(22) Filed: May 6, 2011

(65) Prior Publication Data

US 2012/0228543 A1    Sep. 13, 2012

(30) Foreign Application Priority Data

Mar. 8, 2011   (TW) .............................. 100107800 A

(51) Int. Cl.
*C09K 13/00*     (2006.01)
(52) U.S. Cl.
USPC ........................................................ 252/79.3
(58) Field of Classification Search
None
See application file for complete search history.

(56) References Cited

U.S. PATENT DOCUMENTS

| | | | | |
|---|---|---|---|---|
| 2,504,695 A * | 4/1950 | Jukkola et al. | ................ | 210/677 |
| 4,049,772 A * | 9/1977 | Takada et al. | ................ | 423/54 |
| 4,056,605 A * | 11/1977 | Vulikh et al. | ................ | 423/484 |
| 4,125,594 A * | 11/1978 | Su et al. | ................ | 423/488 |
| 4,132,765 A * | 1/1979 | Yates | ................ | 423/484 |
| 4,144,158 A * | 3/1979 | Nagasubramanian et al. | ................ | 204/517 |
| 4,332,031 A * | 5/1982 | Barkatt et al. | ................ | 376/313 |
| 4,334,949 A * | 6/1982 | Ameen et al. | ................ | 216/93 |
| 4,387,026 A * | 6/1983 | Woolacott | ................ | 210/669 |
| 4,389,293 A * | 6/1983 | Mani et al. | ................ | 204/517 |
| 4,405,576 A * | 9/1983 | Lee et al. | ................ | 423/181 |
| 4,488,949 A * | 12/1984 | Lee et al. | ................ | 205/536 |
| 4,495,250 A * | 1/1985 | Itagaki et al. | ................ | 428/520 |
| 4,500,431 A * | 2/1985 | Miyanaga et al. | ................ | 210/656 |
| 4,524,153 A * | 6/1985 | Funabashi et al. | ................ | 521/26 |
| 4,528,101 A * | 7/1985 | Burke et al. | ................ | 210/656 |
| 4,576,969 A * | 3/1986 | Echigo et al. | ................ | 521/28 |
| 4,734,200 A * | 3/1988 | Berry | ................ | 210/677 |
| 4,927,796 A * | 5/1990 | D'Angelo et al. | ................ | 502/62 |
| 4,936,955 A * | 6/1990 | Dobson et al. | ................ | 203/40 |
| 4,952,386 A * | 8/1990 | Davison et al. | ................ | 423/484 |
| 4,981,664 A * | 1/1991 | Chieng | ................ | 423/339 |
| 4,988,738 A * | 1/1991 | Mitschker et al. | ................ | 521/30 |

(Continued)

OTHER PUBLICATIONS

Handbook of Ion Exchange Resins: Their Application to Inorganic Analytical Chemistry, vol. 6 p. 281 Johann Korkisch, Publisher CRC Press, 1989 ISBN 0849331927, 9780849331923.*

*Primary Examiner* — Allan Olsen
(74) *Attorney, Agent, or Firm* — McDermott Will & Emery LLP

(57) ABSTRACT

A method for purifying fluoride etching solution is provided. The method begins with a reaction by hydroxide gas or solution to achieve a balance pH condition for the fluoride etching solution. Subsequently, the treated etching solution can be fed by constant velocity pump to a basic anion exchange resin column(s). The basic anion exchange resins remove various contaminants resulting in a saleable product to a wide range of industrial applications. The final solution is collected in a finished product storage tank. The degree of purification by basic anion exchange resin can be verified, if needed at all, thereby making ammonium fluoride (AF), ammonium bifluoride (ABF), anhydrous hydrogen fluoride (AHF) and fluoride mixture to meet the application of industries or different market's application. Further, the ion exchange resins can be regenerated as needed to extend the useful life and system capacity.

16 Claims, 4 Drawing Sheets

(56) References Cited

U.S. PATENT DOCUMENTS

| | | | | |
|---|---|---|---|---|
| 5,165,907 A * | 11/1992 | Chieng | ............ | 423/339 |
| 5,180,750 A * | 1/1993 | Sugaya et al. | ............ | 521/32 |
| 5,312,967 A * | 5/1994 | Kiely et al. | ............ | 560/180 |
| 5,352,345 A * | 10/1994 | Byszewski et al. | ............ | 204/534 |
| 5,403,492 A * | 4/1995 | Salem et al. | ............ | 210/683 |
| 5,405,535 A * | 4/1995 | Yamamoto | ............ | 210/669 |
| 5,500,127 A * | 3/1996 | Carey et al. | ............ | 210/685 |
| 5,728,302 A * | 3/1998 | Connor et al. | ............ | 210/679 |
| 5,804,057 A * | 9/1998 | Zhou et al. | ............ | 205/702 |
| 5,811,012 A * | 9/1998 | Tanabe et al. | ............ | 210/669 |
| 5,876,685 A * | 3/1999 | Krulik et al. | ............ | 423/488 |
| 5,954,965 A * | 9/1999 | Kubota et al. | ............ | 210/638 |
| 6,054,109 A * | 4/2000 | Saito et al. | ............ | 423/584 |
| 6,063,712 A * | 5/2000 | Gilton et al. | ............ | 438/756 |
| 6,090,290 A * | 7/2000 | Goodman et al. | ............ | 210/666 |
| 6,214,301 B1 * | 4/2001 | Taylor et al. | ............ | 423/2 |
| 6,354,913 B1 * | 3/2002 | Miyashita et al. | ............ | 451/41 |
| 6,649,064 B2 * | 11/2003 | Parekh et al. | ............ | 210/651 |
| 6,830,763 B2 * | 12/2004 | O'Leary et al. | ............ | 424/549 |
| 6,998,054 B2 * | 2/2006 | Jangbarwala et al. | ............ | 210/656 |
| 7,291,578 B2 * | 11/2007 | SenGupta et al. | ............ | 502/402 |
| 7,438,817 B2 * | 10/2008 | Nagghappan et al. | ............ | 210/639 |
| 7,625,540 B2 * | 12/2009 | Jangbarwala | ............ | 423/241 |
| 7,666,379 B2 * | 2/2010 | Dukhedin-Lalla et al. | ... | 423/341 |
| 8,043,466 B1 * | 10/2011 | Shin et al. | ............ | 156/345.13 |
| 2003/0047507 A1 * | 3/2003 | Hou et al. | ............ | 210/502.1 |
| 2004/0020840 A1 * | 2/2004 | Kosenka et al. | ............ | 210/263 |
| 2004/0187451 A1 * | 9/2004 | Suzuki et al. | ............ | 55/385.1 |
| 2005/0145572 A1 * | 7/2005 | Jangbarwala et al. | ............ | 210/670 |
| 2006/0065602 A1 * | 3/2006 | Jangbarwala et al. | ............ | 210/656 |
| 2006/0131240 A1 * | 6/2006 | Romano et al. | ............ | 210/683 |
| 2006/0231403 A1 * | 10/2006 | Riviello | ............ | 204/524 |
| 2008/0290030 A1 * | 11/2008 | Nagghappan et al. | ............ | 210/639 |
| 2008/0306261 A1 * | 12/2008 | Schneider et al. | ............ | 544/204 |
| 2010/0147334 A1 * | 6/2010 | Ogihara et al. | ............ | 134/26 |
| 2011/0309017 A1 * | 12/2011 | Hassler et al. | ............ | 210/638 |
| 2012/0107210 A1 * | 5/2012 | Harrison et al. | ............ | 423/276 |
| 2012/0255911 A1 * | 10/2012 | Fukui et al. | ............ | 210/660 |
| 2012/0305483 A1 * | 12/2012 | Nagghappan et al. | ............ | 210/639 |
| 2013/0161264 A1 * | 6/2013 | Lurie et al. | ............ | 210/716 |
| 2013/0180922 A1 * | 7/2013 | LIU et al. | ............ | 210/656 |

* cited by examiner

METHOD FOR PURIFYING FLUORIDE ETCHING SOLUTION BY USING HYDROXIDE COMPOUND AND ION EXCHANGE RESIN ABSORPTION

RELATED APPLICATIONS

This application claims priority to Taiwan Application Serial Number 100107800, filed on Mar. 8, 2011, which is herein incorporated by reference.

BACKGROUND

1. Field of Invention

The present invention relates to a method for treating etching solution. More particularly, the present invention relates to a method for purifying fluoride etching solution.

2. Description of Related Art

As to waste etching solutions discarded from the substrate etching processes of the semiconductor, liquid crystal display (LCD) and solar energy industries, they usually include unspent etching solutions (strong acids or alkalines such as hydrogen fluoride) and impurites (anions, cations and metal oxides) etched from the devices of the semiconductor, LCD and solar energy. Such discarded solutions increase environmental burdens and lower economical benefit.

As exemplified by the fluoride etching solution, it is widely used in wet processes of the silicon wafers, glass substrates, silicon substrates of solar batteries and so on. The source of the fluoride etching solution includes unspent etching solutions and waste etching solutions used in many times of wet etching processes. After being used many times of wet etching processes, the waste etching solutions contain various impurities such as anions, cations and metal oxides) etched from those substrates. More impurities accumulated in the etching solution exhibit the lower etching rate of the etching solution and adversely affect the production performance and the etching quality. When the impurities accumulated in the etching solution severely affect the etching quality, such etching solution in the whole tank must be replaced with a fresh etching solution.

However, the discarded waste etching solutions increase environmental burdens and lower economical benefit. Besides, the conventional methods for purifying waste etching solution have been proposed, but their processes are too complicated, expensive and inappropriate to reuse the waste etching solution. Furthermore, the waste etching solution is hardly processed to the fluoride etching solution that meets the requirement of the industrial processes.

As described above, it is necessary to provide a method for purifying fluoride etching solution for overcoming the problems of reuse of the waste fluoride etching solution.

SUMMARY

A method for purifying fluoride etching solution is provided. A regenerably basic anion exchange resin can absorb boron ion and phosphate ion in the fluoride etching solution, so as to obtain an effluent of purified fluoride etching solution. The resultant purified fluoride etching solution can be further subjected to a post-treatment, for providing products of ammonium fluoride (AF), ammonium bifluoride (ABF), anhydrous hydrogen fluoride (AHF) or fluoride mixture.

Accordingly, the invention provides a method for purifying fluoride etching solution. In an embodiment, the method begins with pH adjustment of the fluoride etching solution to pH 6.5-8.0 by using a hydroxide compound, in which the fluoride etching solution comprises hydrogen fluoride (HF), ammonium fluoride (AF), boron ion ($B^{3+}$) and phosphate ion ($PO_4^{3-}$). Moreover, a basic anion exchange resin may be subjected to a resin pretreatment, in which sodium hydroxide (NaOH) solution is passed through the basic anion exchange resin in the resin pretreatment. And then, the fluoride etching solution with an adjusted pH is passed through a pretreated basic anion exchange resin, so that the boron ion and the phosphate ion are absorbed in the pretreated basic anion exchange resin and an effluent is obtained. The resultant effluent is a purified fluoride etching solution, and the boron ion and the phosphate ion in the effluent are 1 ppb to 200 ppb, respectively.

According to an embodiment of the invention, the aforementioned hydroxide compound is ammonia gas or ammonium hydroxide solution.

According to an embodiment of the invention, the aforementioned fluoride etching solution is passed through the pretreated basic anion exchange resin in a bulk velocity of 4 to 20 times the resin volume.

According to an embodiment of the invention, after the effluent is obtained, the aforementioned method further includes to subject the effluent to post-treatment, thereby providing products of ammonium fluoride (AF), ammonium bifluoride (ABF), anhydrous hydrogen fluoride (AHF) or fluoride mixture.

According to an embodiment of the invention, when the concentrations of the boron ion and the phosphate ion in the effluent are more than the reference value, respectively, the present method further includes to subject the basic anion exchange resin to at least once of a regeneration treatment. Next, another fluoride etching solution is passed through a regenerated basic anion exchange resin, so that another effluent is obtained. And then, concentrations of the boron ion and the phosphate ion in another effluent are detected. Later, the concentrations of the boron ion and the phosphate ion are determined less than the reference value or not, respectively.

In an example, when the concentrations of the boron ion and the phosphate ion in the effluent are determined less than the reference value, respectively, the present method further includes to pass the fluoride etching solution with the adjusted pH through the pretreated basic anion exchange resin, so that the boron ion and the phosphate ion are absorbed in the pretreated basic anion exchange resin and an effluent is obtained. Alternatively, when the concentrations of the boron ion and the phosphate ion in the effluent are determined more than the reference value, respectively, the present method further includes to subject the basic anion exchange resin to at least once of a regeneration treatment.

According to other embodiments of the invention, 0.5 weight percent to 10 weight percent of the NaOH solution is used in the resin pretreatment and regeneration treatment, and the NaOH solution is passed through the basic anion exchange resin in a bulk velocity of 1 to 10 times the resin volume.

With application of the method for purifying fluoride etching solution, the fluoride etching solution is recycled by the regenerably basic anion exchange resin, so that the contamination and treating cost due to the fluoride etching solution can be drastically reduced, and the purified fluoride etching solution can be further processed to other products for being reusing in other industrial processes.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
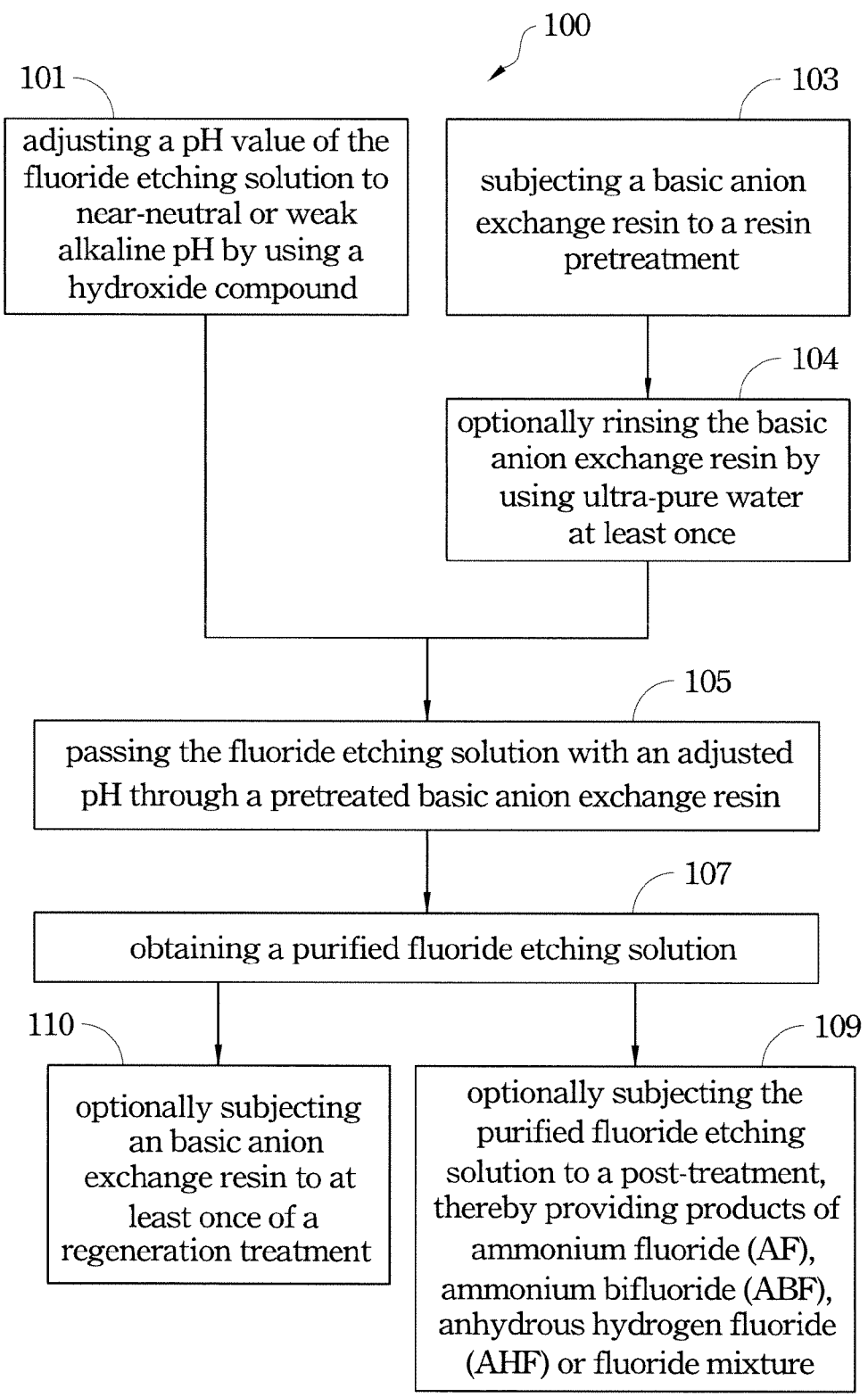
FIG. 1 depicts a partially flow chart of a method for purifying fluoride etching solution according to an embodiment of the present invention.

The present invention provides a method for purifying fluoride etching solution, which uses a regenerably basic anion exchange resin that can absorb impurities in the fluoride etching solution, so as to recycle and purify the fluoride etching solution, for being applied in wet-etching processes in various industries such as semiconductor, liquid crystal display, solar energy and so on.

Hereinafter, the present invention is described in more detail and specifically with reference to the Examples. Reference will now be made in detail to the present embodiments of the invention, examples of which are illustrated in the accompanying drawings. Wherever possible, the same reference numbers are used in the drawings and the description to refer to the same or like parts.

Method For Purifying Fluoride Etching Solution

Reference is made to FIG. 1, which depicts a partially flow chart of a method for purifying fluoride etching solution according to an embodiment of the present invention.

In general, the fluoride etching solution has a relatively low pH value, the fluoride etching solution comprises hydrogen fluoride (HF), ammonium fluoride (AF) and impurities of cations and anions such as boron ion ($B^{3+}$) and phosphate ion ($PO_4^{3-}$). Thus, in an embodiment, as shown in the step 101, the method 100 for purifying fluoride etching solution can use a hydroxide compound to adjust a pH value of a fluoride etching solution to near-neutral or weakly alkaline pH.

In an example, the hydroxide compound is preferred to ammonia gas or ammonium hydroxide solution. The ammonia gas or ammonium hydroxide solution can be used to adjust the pH value of the fluoride etching solution to near-neutral or weakly alkaline pH such as pH 6.5-8.0. It should be mentioned that, the hydroxide compound used in the present method is limited to ammonia gas or ammonium hydroxide solution instead of other hydroxide compounds. On one hand, the ammonia gas reacts with HF to generate ammonium fluoride (AF) that can be further applied in other industrial processes, for example, a buffered oxide etchant (BOE) that is a mixture of AF and HF in water. On the to other hand, the ammonia gas or ammonium hydroxide solution has no metal ions, and it does not contaminate the fluoride etching solution due to the presence of metal ions during the pH-adjusting step. Furthermore, if the pH value of the fluoride etching solution is adjusted to pH 6.5-8.0 rather than using the ammonia gas or the ammonium hydroxide solution, or its pH value is adjusted far beyond such range (for example, less than pH 6.5 or more than pH 8.0), the impurities of boron ion ($B^{3+}$) and phosphate ion ($PO_4^{3-}$) in the fluoride etching solution will be unlikely removed by a single step of passing through a pretreated basic anion exchange resin.

As aforementioned, the present invention utilizes a regenerably basic anion exchange resin to remove the impurities of boron ion ($B^{3+}$) and phosphate ion ($PO_4^{3-}$) in the fluoride etching solution. In an embodiment, as shown in the step 103, the basic anion exchange resin can be subjected to a resin pretreatment. Typically, any commercially available basic anion exchange resin may be suitable. In an example, 0.5 weight percent to 10 weight percent of the NaOH solution may be passed through the basic anion exchange resin during the resin pretreatment. In another example, 1 weight percent to 5 weight percent of the NaOH solution may also be passed through the basic anion exchange resin during the resin pretreatment. It should be mentioned that, the use of other alkaline solutions are excluded from the resin pretreatment of the present invention except for NaOH solution. If the alkaline solution (for example, KOH solution) other than the NaOH solution are used in the resin pretreatment, the metal ions (for example, potassium ion) remained in the resin will contaminate the resin and the subsequently purified fluoride etching solution. The remained metal ions will result in adverse effects upon the purity and etching rate of the purified fluoride etching solution.

In an example, during the step 103 of the resin pretreatment, the NaOH solution is passed through the basic anion exchange resin in a bulk velocity of 1 to 10 times of the resin volume per hour. In another example, the NaOH solution is also passed through the basic anion exchange resin in a bulk velocity of 2 to 8 times of the resin volume per hour. In a further example, the NaOH solution may be passed through the basic anion exchange resin in a bulk velocity of 3 to 6 times of the resin volume per hour.

And then, as shown in the step 105, the fluoride etching solution with an adjusted pH is passed through the pretreated basic anion exchange resin, so that the boron ion and the phosphate ion are simultaneously absorbed in the pretreated basic anion exchange resin. At the same time as passing the etching solution through the resin, as shown in the step 107, an effluent obtained from the basic anion exchange resin is a purified fluoride etching solution. Since the effluent is obtained from directly passing through the fluoride etching solution with an adjusted pH, but not from other elution buffers that are used to elute the resin, an elution buffer can be significantly reduced in usage by the present method 100.

In an example, the boron ion and the phosphate ion in the resultantly purified fluoride etching solution are 1 ppb to 200 ppb, respectively, which depend upon the requirement of client's demand or various types of products. In other cases, the boron ion and the phosphate ion in the purified fluoride etching solution are also 10 ppb to 200 ppb or 10 ppb to 100 ppb.

It is worth mentioning that, as shown in the step 109, the resultantly purified fluoride etching solution can be optionally subjected to a post-treatment to for providing products of ammonium fluoride (AF), ammonium bifluoride (ABF), anhydrous hydrogen fluoride (AHF) or fluoride mixture that are applied in processes of various industries such as semiconductor, liquid crystal display, solar energy and so on. AF, ABF, AHF or fluoride mixture is made by conventional or well known to one of ordinary skill in the art and needs not be is disclosed in detail.

Besides, as shown in the step 110, for the purpose of repeat use, the used basic anion exchange resin can be optionally subjected to a resin regeneration treatment that is discussed later.

Figure 2:
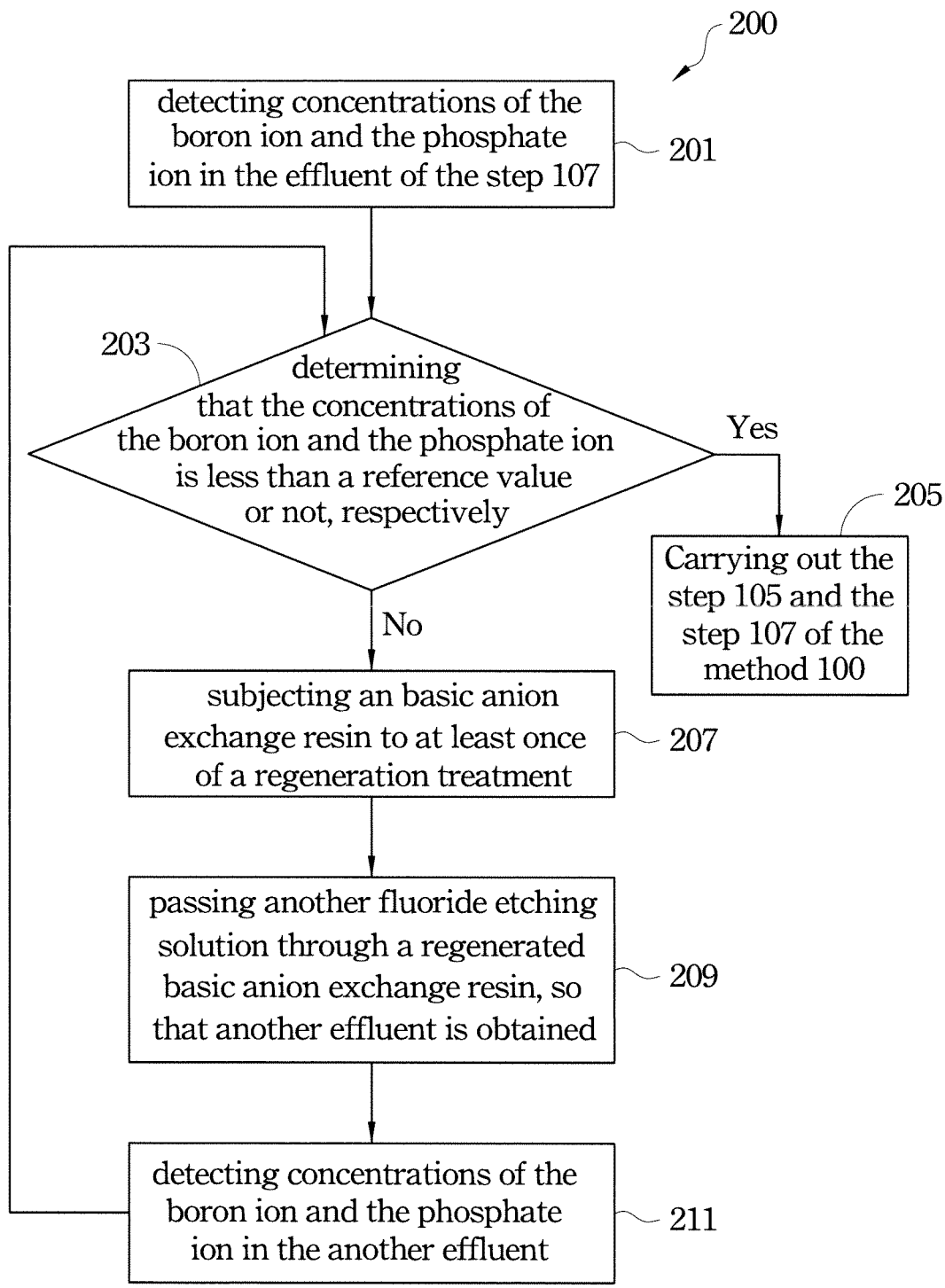
FIG. 2 depicts a flow chart of a method of a resin regeneration treatment according to an embodiment of the present invention.

Reference is made to FIG. 2, which depicts a flow chart of a method of a resin regeneration treatment according to an embodiment of the present invention, in which the method 200 is referred to the step 110 of FIG. 1 in detail.

In an example, as shown in the step 201, the present method 200 can begin with detecting concentrations of the boron ion and the phosphate ion in the effluent. A detector such as inductively coupled plasma mass spectrometer (ICP-MS), other detection instrument or process monitoring system can be applied in the step 201, so as to detect the impurity absorption capacity of the basic anion exchange resin. The aforementioned detection of ion concentrations is well known to one of ordinary skill in the art and needs not be disclosed in detail.

Next, as shown in the step 201, the concentrations of the boron ion and the phosphate ion are determined less than a reference value or not, respectively, in which the reference value depends on the actual requirement related to an electrical-level quality, for example, 200 ppb or other concentrations.

In an example, when the concentrations of the boron ion and the phosphate ion in the effluent are determined less than the reference value, respectively, the step 105 and the step 107 of the method 100 can be carried out.

In another example, when the concentrations of the boron ion and the phosphate ion in the effluent are determined more than the reference value, respectively, the step 207 can be further carried out to subject the basic anion exchange resin to at least once of a resin regeneration treatment. In this example, since the resin regeneration treatment is carried out by using the same solution and flow velocity as the resin pretreatment of the step 103, it needs not be discussed in detail.

Later, as shown in the step 209, the another fluoride etching solution is passed through a regenerated basic anion exchange resin, so that another effluent is obtained, in which a pH value of the another fluoride etching solution is adjusted in the same manner as the step 101 rather than being described in detail.

Afterward, as shown in the step 211, the concentrations of the boron ion and the phosphate ion in another effluent are detected in the same manner as the step 201 rather than being recited in detail.

And then, as shown in the step 203, the concentrations of the boron ion and the phosphate ion of the another effluent are further determined less than the reference value or not, respectively. In an example, when the concentrations of the boron ion and the phosphate ion in another effluent are determined less than the reference value, respectively, the method 100 can be carried out as shown in the step 205. In another example, when the concentrations of the boron ion and the phosphate ion of the another effluent are determined more than the reference value, respectively, the basic anion exchange resin is subjected to at least once of the step 207 up to the concentrations of the boron ion and the phosphate ion in the another effluent that are less than the reference value, respectively. In a further example, the used resin should be replaced with a new one when the step 207 is repeated in many times (for example, 10 times), and the concentrations of the boron ion and the phosphate ion in the another effluent are still more than the reference value respectively.

System for Purifying Fluoride Etching Solution

Figure 3:
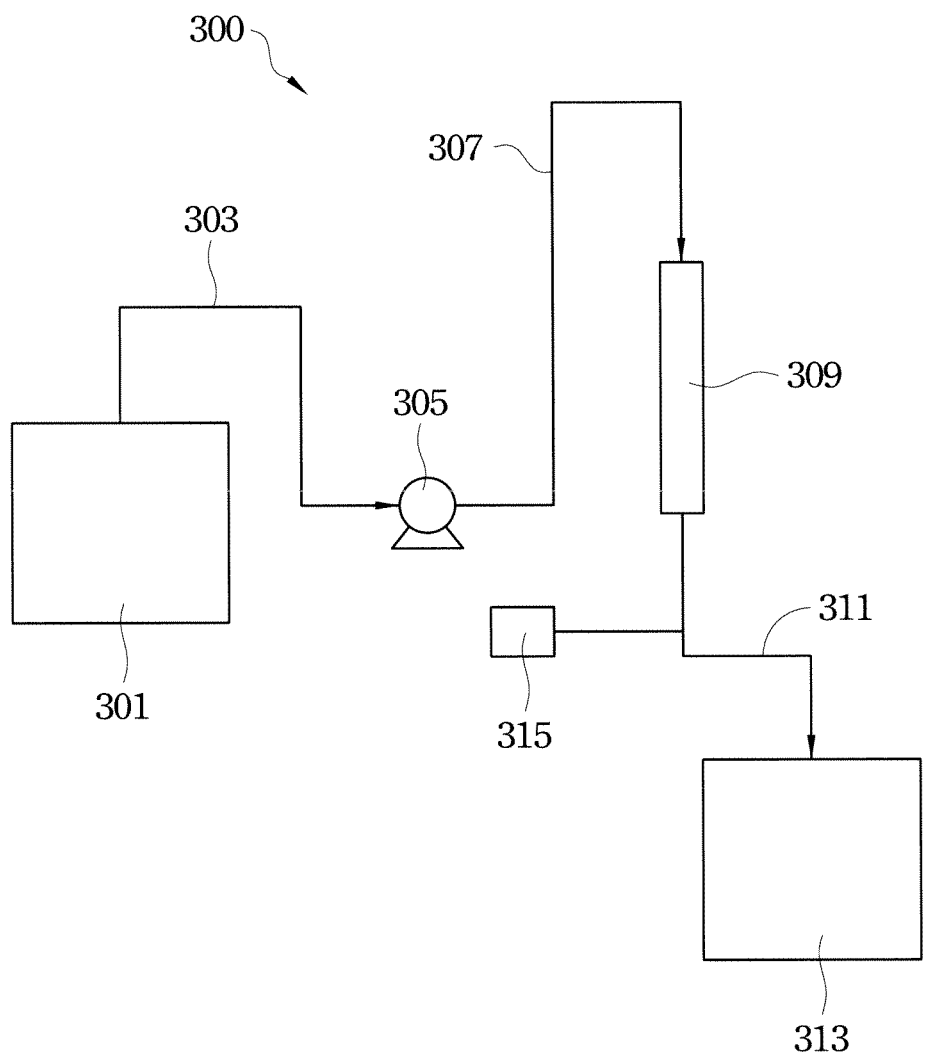
FIG. 3 depicts a reaction system for purifying fluoride etching solution according to an embodiment of the present invention.

In an embodiment, the method for purifying fluoride etching solution can be carried out in a conventional reaction system or a reaction system 300 of FIG. 3. Hereinafter is exemplified by the reaction system 300 of FIG. 3.

Reference is made to FIG. 3, which depicts a reaction system for purifying fluoride etching solution according to an embodiment of the present invention. In an embodiment, the reaction system 300 of FIG. 3 comprises a reacting tank 301. In an example, the reacting tank 301 includes tubes (unshown) connected with the ammonia gas (unshown) or ammonium hydroxide solution (unshown), and the ammonia gas or ammonium hydroxide solution can be introduced into the reacting tank 301 for adjusting the pH value of the fluoride etching solution. In another example, the reacting tank 301 also includes a mixing device (unshown) for mixing the being-purified fluoride etching solution with the ammonia gas or ammonium hydroxide solution well in the reacting tank 301. In a further example, the reacting tank 301 includes a pH meter (unshown) for monitoring the pH changes of the fluoride etching solution during the process.

When the pH value of the fluoride etching solution in the reacting tank 301 is adjusted to the aforementioned range, the fluoride etching solution can be further fed into an ion exchange resin tower 309 through a tube 303 and a tube 307 by a constant velocity pump 305, for example. The ion exchange resin tower 309 includes a basic anion exchange resin that is not limited to special types. In an example, the ion exchange resin tower 309 has a diameter of approximately 2 cm and a length of approximately 100 cm. In another example, the constant velocity pump 305 may control the flow velocity of the fluoride etching solution passing through the basic anion exchange resin, so that the ion exchange resin tower 309 simultaneously absorbs the impurities of the boron ion and the phosphate ion in the fluoride etching solution.

After the fluoride etching solution is passed through the ion exchange resin tower 309, an effluent is a purified fluoride etching solution with the adjusted pH, and it is collected into a collecting tank 313 through a tube 311. In an example, the tube 311 has a detector 315 such as ICP-MS, other detection instrument or process monitoring system, so as to detect the concentrations of the boron ion and the phosphate ion in the effluent, thereby monitoring the impurity absorption capacity of the ion exchange resin tower 309. It should be supplemented that, the ion exchange resin tower 309 can be regenerated by repeating many times of the method 200 for achieving a better absorption capacity.

Thereinafter, various applications of the method for purifying fluoride etching solution will be described in more details referring to several exemplary embodiments below, while not intended to be limiting. Thus, one skilled in the art can easily ascertain the essential characteristics of the present invention and, without departing from the spirit and scope thereof, can make various changes and modifications of the invention to adapt it to various usages and conditions.

EXAMPLE

Method for Purifying Fluoride Etching Solution and Assessment Thereof

In this EXAMPLE, ammonia ($NH_3$) gas or ammonium hydroxide solution ($NH_4OH$ aq.) is introduced into the fluoride etching solution for adjusting the pH value of the fluoride etching solution to pH 6.5-8.0 or about pH 7.0.

In the meanwhile, an ion exchange resin (for example, a strongly basic anion exchange resin; DIAION SA10ALLP Type I resin, Tai-Young Chemical Co. Ltd., Kaohsiung, Taiwan) is filled compactly into the ion exchange resin tower. And then, the filled resin in the ion exchange resin tower is pretreated (or regenerated) by passing 10 weight percent of the NaOH solution therethrough in a bulk velocity of 5 times of the resin volume per hour and in a flow velocity of about 10 mL/min. Later, the basic anion exchange resin is rinsed by using ultra-pure water at least once, for removing the residual NaOH solution.

Afterward, the fluoride etching solution with adjusted pH can be fed into the ion exchange resin tower in a flow velocity of about 20 mL/min by the constant velocity pump, so as to absorb the impurities of boron ion ($B^{3+}$) and phosphate ion ($PO_4^{3-}$) in the fluoride etching solution and obtaining an effluent.

The effluent is sampled with a certain amount for detecting the impurities in the purified fluoride etching solution by using ICP-MS.

Figure 4:
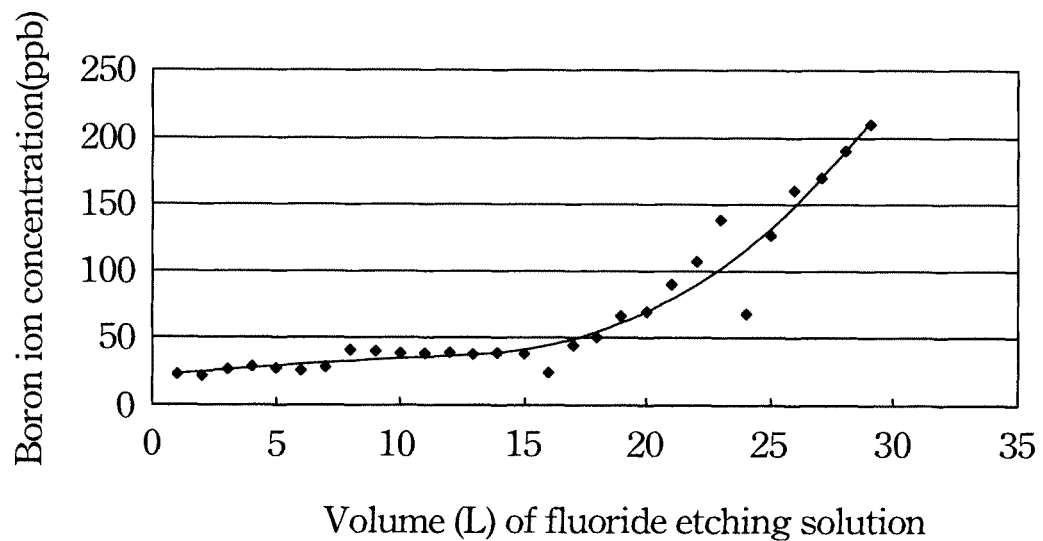
FIGS. 4 and 5 depict the concentrations of the boron ion (FIG. 4) and the phosphate ion (FIG. 5) changing as time progresses in the purified fluoride etching solution according to an embodiment of the present invention.
Figure 5:
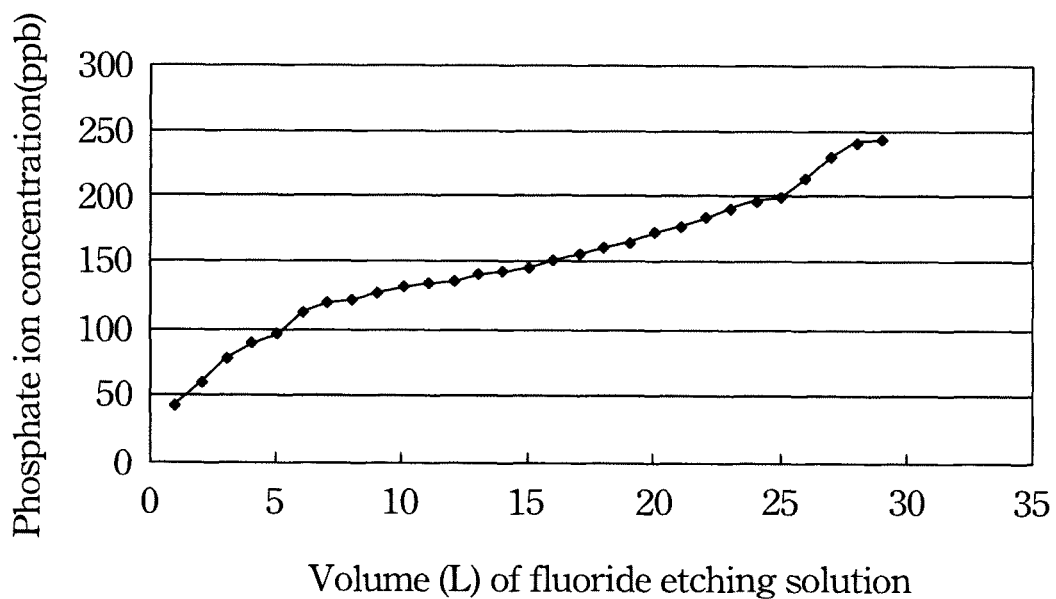

Reference is made to FIGS. 4 and 5, which depict the concentrations of the boron ion (FIG. 4) and the phosphate ion (FIG. 5) changing as time progresses in the purified fluoride etching solution according to an embodiment of the present invention. In FIGS. 4 and 5, the horizontal axis is referred to the volume (L) of the fluoride etching solution treated by the basic anion exchange resin, and the vertical axis is referred to the concentration (ppb) of the boron ion is (FIG. 4) and the phosphate ion (FIG. 5). The initial concentrations of the boron ion (FIG. 4) and the phosphate ion (FIG. 5) in the fluoride etching solution are both 1000 ppb. The treated fluoride etching solution is sampled and analyzed once per liter until the concentrations of the boron ion and the phosphate ion are greater than 200 ppb. The concentration data is then created into a curve diagram.

According to the results of FIGS. 4 and 5, the concentrations of the boron ion and the phosphate ion in the effluent through the absorption of the basic anion exchange resin are decreased to 10 ppb approximately. Accordingly, the basic anion exchange resin can treat 30 liters of the fluoride etching solution that is equivalent to about 40 times the resin volume.

In summary, the present method is evidenced that the purified fluoride etching solution has an electrical-level quality, and the purified fluoride etching solution can be further subjected to a post-treatment, for providing products of ammonium fluoride (AF), ammonium bifluoride (ABF), anhydrous hydrogen fluoride (AHF) or fluoride mixture required by various industries such as semiconductor, liquid crystal display, solar energy and so on.

In addition, it is necessarily supplemented that, specific compounds, specific processes, specific reaction conditions, specific application or specific equipments are exemplified as embodiments in the present invention, for clarifying the method for purifying fluoride etching solution. However, as is understood by a person skilled in the art, the method for purifying fluoride etching solution of the present invention can include other compounds, other processes, other reaction conditions, other application or other comparable equipments rather than limiting to the aforementioned examples.

According to the embodiments of the present invention, the method for purifying fluoride etching solution advantageously includes the regenerably basic anion exchange resin that is utilized to recycle the fluoride etching solution, so that the contamination and treating cost of the fluoride etching solution can be drastically reduced, and the purified fluoride etching solution can be further processed to other products for being reusing in other industrial processes.

As is understood by a person skilled in the art, the foregoing preferred embodiment of the present invention is illustrated of the present invention rather than limiting of the present invention. In view of the foregoing, it is intended to cover various modifications and similar arrangements included within the spirit and scope of the appended claims. Therefore, the scope of which should be accorded the broadest interpretation so as to encompass all such modifications and similar structure.

What is claimed is:

1. A method for purifying fluoride etching solution, comprising:
    adjusting a pH value of the fluoride etching solution to pH 6.5-8.0 by using ammonia gas or ammonium hydroxide solution, wherein the fluoride etching solution comprises hydrogen fluoride (HF), ammonium fluoride (AF), boron ion ($B^{3+}$) and phosphate ion ($PO_4^{3-}$);
    subjecting a basic anion exchange resin to a resin pretreatment, wherein the resin pretreatment is to pass a 0.5 weight percent to 10 weight percent of sodium hydroxide (NaOH) solution through the basic anion exchange resin;
    passing the fluoride etching solution with an adjusted pH through a pretreated basic anion exchange resin, so that the boron ion and the phosphate ion are absorbed in the pretreated basic anion exchange resin; and
    obtaining an effluent from the pretreated basic anion exchange resin,
    wherein the effluent is a purified fluoride etching solution, and in the purified fluoride etching solution, the boron ion has a concentration of 1 ppb to 200 ppb, and the phosphate ion has a concentration of 1 ppb to 200 ppb.

2. The method of claim 1, between the resin pretreatment and the step of obtaining the purified fluoride etching solution, further comprising:
    rinsing the basic anion exchange resin by using ultra-pure water at least once, for removing the NaOH solution.

3. The method of claim 1, wherein the fluoride etching solution is passed through the pretreated basic anion exchange resin in a bulk velocity of 2 to 40 times of the resin volume per hour.

4. The method of claim 1, wherein the fluoride etching solution is passed through the pretreated basic anion exchange resin in a bulk velocity of 3 to 30 times of the resin volume per hour.

5. The method of claim 1, wherein the fluoride etching solution is passed through the pretreated basic anion exchange resin in a bulk velocity of 4 to 20 times of the resin volume per hour.

6. The method of claim 1, wherein the fluoride etching solution is passed through the pretreated basic anion exchange resin in a bulk velocity of 5 to 15 times of the resin volume per hour.

7. The method of claim 1, wherein the fluoride etching solution is passed through the pretreated basic anion exchange resin in a bulk velocity of 6 to 10 times of the resin volume per hour.

8. The method of claim 1, wherein the concentration of the boron ion in the purified fluoride etching solution is 10 ppb to 200 ppb, and the concentration of the phosphate ion in the purified fluoride etching solution is 10 ppb to 200 ppb.

9. The method of claim 1, after obtaining the effluent, further comprising:
    subjecting the effluent to a post-treatment, thereby providing products of ammonium fluoride (AF), ammonium bifluoride (ABF), anhydrous hydrogen fluoride (AHF) or fluoride mixture.

10. The method of claim 1, after obtaining the effluent, further comprising:
    detecting concentrations of the boron ion and the phosphate ion in the effluent; and determining that the concentration of the boron ion is less than a reference value and the concentration of the phosphate ion is less than the reference value, wherein the reference value is 200 ppb.

11. The method of claim 10, wherein the NaOH solution is passed through the basic anion exchange resin in a bulk velocity of 1 to 10 times of the resin volume per hour.

12. The method of claim 10, wherein the NaOH solution is passed through the basic anion exchange resin in a bulk velocity of 2 to 8 times of the resin volume per hour.

13. The method of claim 10, wherein the NaOH solution is passed through the basic anion exchange resin in a bulk velocity of 3 to 6 times of the resin volume per hour.

14. A method for purifying fluoride etching solution, comprising:
adjusting a pH value of the fluoride etching solution to pH 6.5-8.0 by using ammonia gas or ammonium hydroxide solution, wherein the fluoride etching solution comprises hydrogen fluoride (HF), ammonium fluoride (AF), boron ion ($B^{3+}$) and phosphate ion ($PO_4^{3-}$);
subjecting a basic anion exchange resin to a resin pretreatment, wherein the resin pretreatment is to pass a 0.5 weight percent to 10 weight percent of sodium hydroxide (NaOH) solution through the basic anion exchange resin;
passing the fluoride etching solution with an adjusted pH through a pretreated basic anion exchange resin, so that the boron ion and the phosphate ion are absorbed in the pretreated basic anion exchange resin;
obtaining an effluent from the pretreated basic anion exchange resin; and
detecting concentrations of the boron ion and the phosphate ion in the effluent,
wherein when the concentration of the boron ion and the concentration of the phosphate ion in the effluent are individually determined to be greater than a reference value, the reference value being 200 ppb, the method further comprises:
subjecting the basic anion exchange resin to at least one regeneration treatment, wherein the regeneration treatment is to pass 0.5 weight percent to 10 weight percent of the NaOH solution through the basic anion exchange resin;
passing another fluoride etching solution through the regenerated basic anion exchange resin, wherein a pH value of the another fluoride etching solution is adjusted to pH 6.5-8.0 by using the ammonia gas or the ammonium hydroxide solution;
obtaining another effluent;
detecting concentrations of the boron ion and the phosphate ion in the another effluent; and
determining that, with respect to the another effluent, the concentration of the boron ion is less than the reference value and the concentration of the phosphate ion is less than the reference value,
wherein in the another effluent, the boron ion has a concentration of 1 ppb to 200 ppb, and the phosphate ion has a concentration of 1 ppb to 200 ppb.

15. The method of claim 14, wherein 0.5 weight percent to 5 weight percent of the NaOH solution is used in the regeneration treatment.

16. The method of claim 14, wherein 1 weight percent to 5 weight percent of a NaOH solution is used in the resin pretreatment and the regeneration treatment.

* * * * *